Oct. 25, 1966     B. J. MILLEVILLE     3,281,114
HIGH PRESSURE VALVE CONSTRUCTION

Filed July 15, 1963                              2 Sheets-Sheet 1

INVENTOR.
BERTRAM J. MILLEVILLE
BY Kenwood Ross
ATTORNEY.

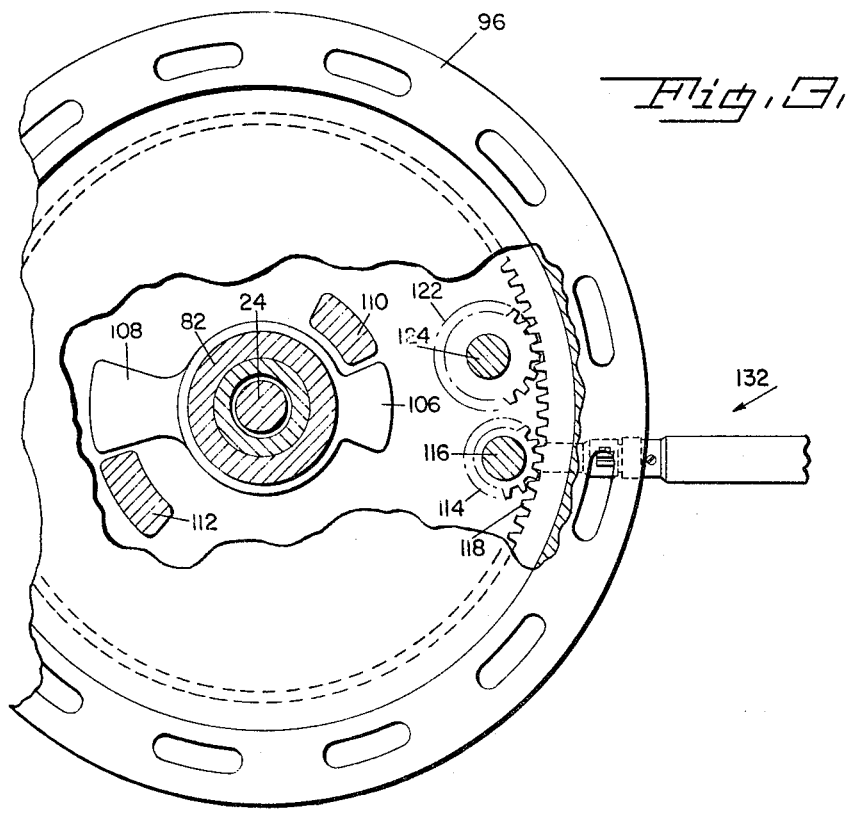
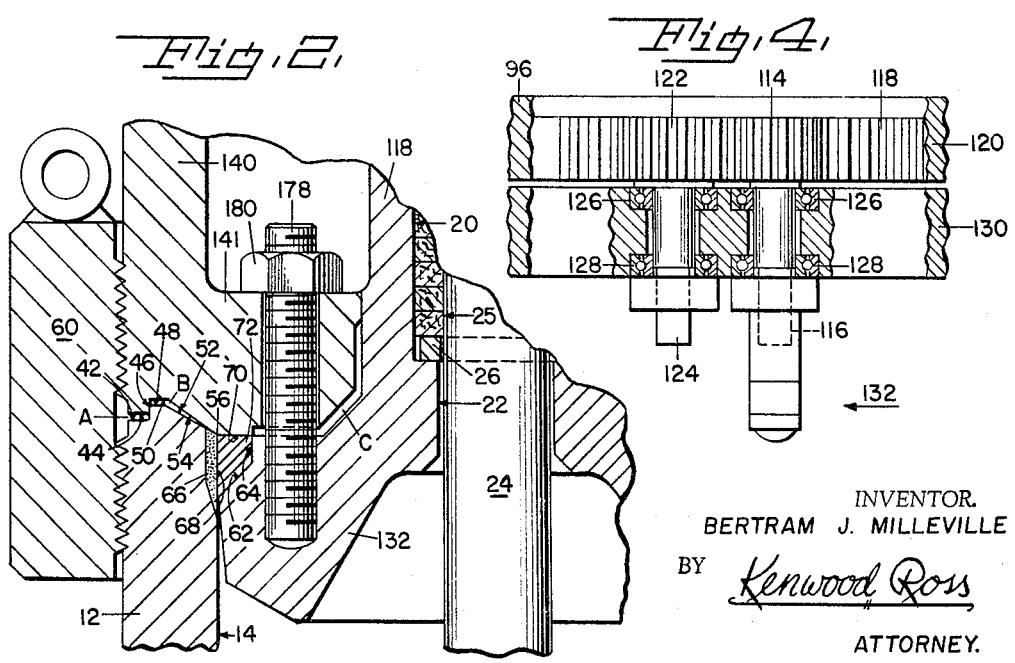

United States Patent Office 3,281,114
Patented Oct. 25, 1966

3,281,114
HIGH PRESSURE VALVE CONSTRUCTION
Bertram J. Milleville, East Longmeadow, Mass., assignor to Chapman Division—Crane Co., Indian Orchard, Mass.
Filed July 15, 1963, Ser. No. 295,149
4 Claims. (Cl. 251—367)

The present invention relates to refinements in valve constructions particularly suited for controlling the flow of fluids in high temperature and/or high pressure service, and more especially to large pressure seal closures and means for moving the valve element thereof between opened and closed positions.

Valves of the type contemplated for use herein may control the flow of fluids at pressures of as much as 3000 p.s.i. and higher and may be offered in a range of sizes incorporating therewithin closure elements having diameters measuring as much as twelve inches or more and valve stems having diameters measuring as much as four inches or more, with closure element travel, between opened and closed positions, of as much as fourteen inches or more.

As a primary object hereof, I provide a new and novel solution for certain heretofore troublesome structural design problems encountered in pressure sealing arrangements of the general type where the applied internal fluid pressure becomes a relatively large fraction of the allowable stresses permitted in the structural materials.

In the design of valves of comparable internal dimensions, it is obvious that, as pressures increase, stem loading will normally increase proportionately, requiring stem diameters to be proportionately larger, as compared with body bore diameters. The resulting increases in stuffing box and bonnet diameters minimize the space available between the bonnet and valve body for the pressure seal retaining and preloading components and offer obvious assembly and disassembly problems.

One special feature of this invention comprehends the coupling of a pressure seal gasket bonnet retaining means to the body or casing at the outside diameter of the bonnet neck to novelly solve the problem of limited bonnet-to-body bore space with a design capable of being extrapolated to almost any size or pressure. Such makes the entirety of the body wall-to-bonnet space available for other necessary functions essential in effectuating proper pressure seal operation. Additionally, it results in a minimizing of the valve body height, thereby reducing casting quality problems, particularly in the pressure seal gasket contact area. Further, it allows improved modes of access to the seating area.

The problem of obtaining adequate structure for coupling the gasket retaining means to the valve body is considerably alleviated by virtue of the allowed substantially larger body circumference at the outside diameter, as compared with the valve body inside diameter, wherefore the pounds of load per inch of circumference are minimal, when contrasted with those offered when working within a valve body interior.

Additionally to the provided external connection, the achieved simplification of design includes an integration of the gasket retaining and yoke components which, in other constructions, normally comprise separate parts, each requiring its own means of attachment to the assemblage.

As a further refinement, I provide seal means for attaining fluid-tight seals in pressure casing openings with adequate capacity for withstanding the encountered high pressures and/or temperatures, thereby offering superior degrees of operating effectiveness.

As another feature of the constructional arrangement of sealing means, cooperant with the coupling ring structure and other components of the invention, I envision an annular interval or space between confronting sealing surfaces, one said surface being provided by the bonnet extension of the body, one or more being provided by the bonnet, and one being provided by the yoke, in which interval or space, an annular pressure seal or gasket of complementary configuration is interposed and accommodates to a diametral interlock between the yoke and valve body components immediately above the pressure seal area wherewith a mutual physical support between the valve body and yoke is allowed. Thereby, the outward expansion of the valve body, under the influence of internal pressure, and the upward thrust of the seal, coupled with a downwardly directed restraint of an outside ring nut, witnesses a tendency of the bottom ringlike gasket retaining portion of the yoke to twist inwardly toward valve center at its bottom area, and to twist outwardly away from valve center at its top area. The outward expansion of the body wall adjacent the bottom area of this ring portion opposes this inward-directed movement of the bottom area of the ring portion; conversely, the inward deflection of the bottom area of the ring portion opposes the outward expanding movement of the body. Of the two tendencies, in general, the inward-directed tendency of the gasket retainer component is the stronger so as to serve to tighten the embracement of the pressure seal surface of the body against the gasket thereadjacent.

As yet another improvement in constructional arrangement of sealing structure and related parts, I provide sealing means cooperant with a valve body and yoke and bonnet which may be subjected to preloading whereby the sealing means may be deflected into sealing position with reference to seal surfaces on the respective confronting wall portions of said valve body, yoke and bonnet and the interval provided therebetween so as to maintain an effective seal via the stored energy within said sealing means resulting from this deflection as well as via the augmentation of the sealing engagement by the internal fluid pressures generated within the casing during operational use.

Further in the instant concept, the valve is normally opened and closed through cooperant means including, among other elements, a threaded stem bushing operated by a handwheel, a novelly-assemblable ball bearing support for the handwheel, hammerblow lugs strategically positioned to allow a degree of free rotation preparatory to impact, and high and low speed drive pinions alternately employable with a portable power driven device to drive the closure elements to or away from approximate sealing position and to accelerate the handwheel for impacting into or away from final tight-sealed position.

The closure element per se is moved through a major portion of its travel toward and away from a position close to the fully-closed, finally-sealed position with a substantially constant relatively high torque and by means of a substantially higher torque is moved between said closed position and the said fully-closed finally-seated position.

The torque required to move through the said major portion of travel might be developed manually, but because of the relatively large forces having to be moved the substantial distance, such involves the delivery of a large amount of energy and is representative of an excessively time-consuming process, possibly requiring as much as an hour or more of time and the efforts of three or four men.

Many expedients, such as gear drives or electric or hydraulic or pneumatic motors, have been heretofore proposed to facilitate such operation, yet none has proven entirely satisfactory. In the case of gear drives, the time increment required to move between opened and closed positions has usually increased to an unreasonable value and in the case of certain motorized units, excessively high initial and maintenance costs have been involved.

The practical limitations on the total energy which can be manually delivered within a reasonable time period, have dictated utilization of power drive devices in applications involving the operation of relatively large valves in relatively high pressure service. Such devices are inherently more costly than the alternate manually-operated construction, in part because of the necessity of delivering the final-seating effort with the same power train employed to deliver the running-down effort.

A mechanism capable of the latter delivery, but not capable of the former, would be lighter and less costly, and could serve to deliver the major portion of the total energy required for a specific valve operation, as taught in my earlier Patent No. 2,942,495 dated June 28, 1960, wherein I take advantage of the high efficiency of a large hammer blow type handwheel to deliver the final-seating effort by a manual impacting operation, after having used a portable power drive to drive the valve from open to closed, but not tight seated position. The present invention overcomes a serious limitation of this earlier invention, in respect to this dependence upon manual operation for the final valve seating.

As a further refinement of this invention, I provide a valve operator assembly adapted to drive the closure element by means of drive pinions, alternately employable, one for use in driving the closure element through its major portion of run-down travel and/or its retrograde movement and one for use through torque multiplication to effect final seating or initial unseating, said assembly being inclusive of an impact-developing handwheel and a novel gear train interconnected therewith and receiving its motive power from the output shaft of an air or electric motor which may be of the portable type.

A novel lug arrangement allows a more than doubling of the lost motion rotation available for acceleration of the handwheel to a high velocity at impact, as compared with previous balanced impact hammer blow devices, and the provision of an alternate large diameter pinion assures attainment of said high velocity by utilization of the same device as is used for the slower running-down operation.

These foregoing objects and other incidental ends and advantages characterize the devices of the present invention, and distinguish them from previously known devices of a kindred nature.

While these objects are attainable in the preferred and disclosed embodiment, it is to be understood that, by utilizing the invention only in certain of its aspects, certain of the objects may be attained individually or in sub-groups. That is, while the advantages of the invention, as here outlined, are best realized, then all of its features and instrumentalities are combined, useful embodiments may be produced involving less than the whole. Too, these objects can be achieved by use of whole. Too, these objects can be achieved by use of constructions different in certain respects from those disclosed, such as minor changes and variations in dimensions, shape, form, proportion, integration, cooperation of material and/shape or type of subassembly and accessory, all without departing from the underlying principles, salient features, scope and spirit hereof.

The characteristic features which I consider to be novel with the invention, as to its construction and method of operation, will be better understood from a consideration of the following detailed description forming a part of this specification, when read in conjunction with the illustrations in the accompanying drawings, in which:

FIG. 2 illustrates, in enlarged, fragmentary, sectional view, a modified form of the pressure seal gasket and bonnet retaining means of the invention;

Figure 1:
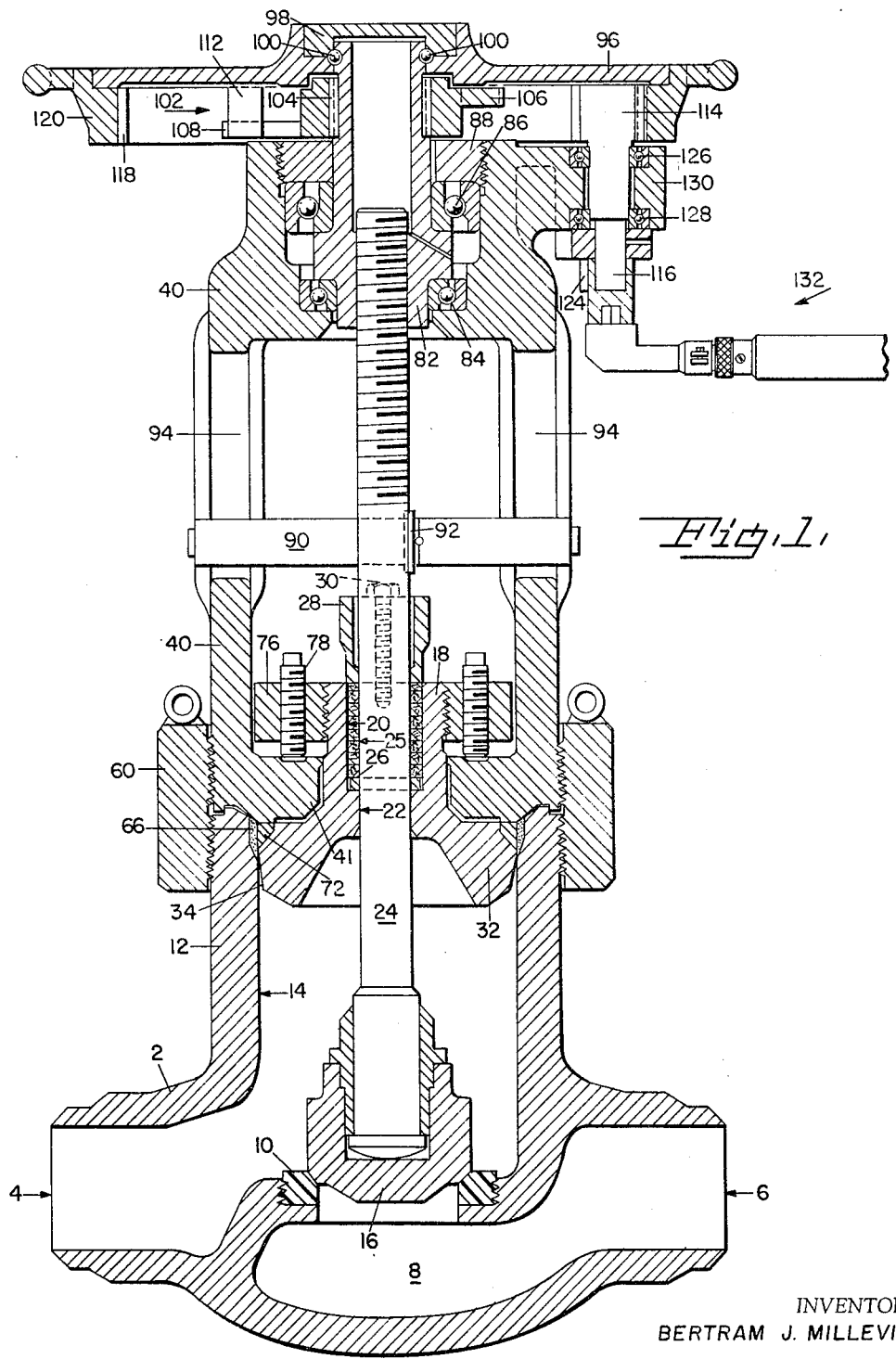
FIG. 1 illustrates, in sectional elevational view, a valve constructed in accordance with the teachings of the invention.

FIG. 3 illustrates, fragmentarily, a top plan view of the handwheel and related components of the invention, with portions of the handwheel being broken away for purposes of clarity, and showing a portable power drive device associated with one of the drive pinions of the assemblage; and FIG. 4 illustrates, fragmentarily, a side elevational view of the gear train of the invention, as viewed from the left of the structure as shown in FIG. 3, with certain portions being omitted and other parts being broken away for purposes of clarity.

In the following description and appended claims, various components and details thereof are identified by specific names for purposes of convenience in identification and same are used in a generic and descriptive sense only. Such terminology is not for any purpose of limitation.

With continued reference now to the drawings, which illustrate typical embodiments of the invention for the purpose of disclosure and form a part of this specification, I have shown a valve assembly comprising generally a globe type valve body 2 inclusive of an inlet or end port 4 and a coaxial outlet or end port 6 interconnected by a through flow passage 8 and an annular, horizontally-disposed seat 10 in said through flow passage which may comprise a hard alloy, inserted element secured to body 2 and having a flat or bevelled wear resistant seating surface. Alternatively, said seating arrangement may comprise an integrally-formed seat which may be hard surfaced by any suitable technique and machined in situ.

Body 2 additionally comprehends an integral vertically-disposed externally-threaded or grooved bonnet extension 10 having a vertically-disposed opening 14 therethrough communicating with through flow passage 8 and through which opening a closure element 16 may be reciprocably received, said closure element being provided with a lowermost seating surface engageable with seat 10 when in lowermost closed position for effectuating control of fluid passage through the valve body and being positively moved toward said closed position by means subsequently to be defined.

It will be understood that, while I here describe and show a valve of the globe type, the invention is applicable to gate and angle and other valve types with equal facility.

A bonnet 18 is strategically positioned in bonnet extension 12 and is provided in its upper portion with a vertically-extending centrally-located counterbore 20 and an opening 22 therebelow coaxial therewith and extending through the bonnet body, said opening being so diametered as to allow a liberal clearance for a valve stem 24 extendable therethrough and through the counterbore for free longitudinal movement thereof relative to the bonnet.

Conventional packing 25 is disposed in counterbore 20 in surrounding relation to valve stem 24 to provide a suitable bonnet-valve stem seal as the packing is compressed longitudinally by such as a packing gland means 28 and bolts 30, all of known design.

A metallic ring 26, seated upon the lower wall of the counterbore, is preferentially of such dimensions as to allow a close clearance with the valve stem, thereby to limit packing extrusion.

In conventional manner, said valve stem and closure element are interengaged so that the latter may be movable between fully-closed position where it sealingly engages the complementary seating surface of the valve seat for closing the through flow passage and fully-opened back seat position away therefrom.

Said bonnet 18 serves as a valve body closing member, in conventional valve bonnet manner, and is constituted by vertically-extending valve stem-circumscribing portion, previously referred to, and unitary therewith, a radially-disposed lower or base or flange portion 32 which presents an outermost peripheral wall surface 34 allowing nesting disposition of the bonnet within the bonnet extension and below the uppermost planar surface thereof in operative position.

A gasket retainer-yoke component 40, having a lower inwardly-facing flange or gasket retainer ring portion 41 formed unitarily therewith, presents a lowermost peripherally-located surface seatable upon the upper upwardly-facing planar surface of bonnet extension 12 immediately adjacent a pressure seal or gasket contact area, as will be observed.

To provide mutual physical support between the valve body and yoke, a diametral interlock is provided immediately above the horizontal plane of the pressure seal gasket contact area and assumes the nature of a male and female guide fit, bonnet extension 12 being provided with an upwardly-facing peripherally-arranged annular recess 42 at its upper outermost area, and yoke 40 being provided with a complemental downwardly-facing peripherally-arranged annular projection 44. Recess 42 and projection 44 may be so related, the latter nesting in the former, as to provide a slight clearance, delineated by the letter A, between the horizontally-disposed confronting surfaces.

Annular recess 42 and annular projection 44 additionally define juxtaposed annular vertically-extending confronting wall surfaces at 46 which, upon assembly, enjoy a tight-fitting relationship as to each other.

Inwardly of these wall surfaces at 46, the bonnet extension defines a horizontally-extending upwardly-facing annular wall surface 48 and the yoke defines a complemental horizontally-extending downwardly-facing annular wall surface 50 which may have a slight clearance, delineated by the letter B, therebetween.

Inwardly of wall surfaces 48 and 50, bonnet extension 12 and yoke 40 may be provided with annular complementally-inclined wall surfaces 52 and 54 respectively which may converge inwardly and toward each other to define an annular line of contact 56 therebetween, which line of contact is adjacent the pressure seal gasket, yet to be described.

The interlocking feature thereby obtained provides mutual physical support, in the radial sense, between body 2 and yoke 40 and serves to aid in exploiting development of the generated forces resulting from operational use.

With yoke 40 seated upon body 2, the members are clamped together by an external coupling ring 60 having a pair of internal thread portions cooperating respectively with annular grooves suitably provided in the form of a helix of a right hand thread on the bonnet extension exterior surface and threads of a left hand thread suitably provided on the yoke exterior surface to achieve a differential action as the coupling ring is rotated to draw the yoke to tight seating engagement upon the bonnet extension in clamped relationship therewith, the additional advantage of allowing a reinforcement of the body against internal pressures and gasket wedging loads. Such arrangement avoids the expensive operation of threading on the body and permits the adjustment of endwise dimensions by rotation of the coupling ring in situ acting on the thread at the yoke end.

The upper portion of the outer peripheral wall of base or flange portion 32 of bonnet 18 is provided with an annular recess configured to present an angularly-disposed outwardly and upwardly-facing surface 62 and an adjoining substantially vertically-disposed outwardly-facing surface 64.

Complemental thereto, the interior wall of bonnet extension 12 adjacent its upper limit is suitably recessed to allow inlaying of an annular spacer ring 66 as by applying a weld metal to the casting, thereby to provide an inwardly-facing surface 68.

Also complemental thereto, an annular ringlike downwardly-facing and projecting bearing surface 70 of yoke 40 is provided.

Surfaces 62, 64 and 68 are characterized by different angles wherewith the annular interval or groove defined cooperantly by surfaces 62, 64, 68 and 70 provides a generally wedge shaped space into which an annular pressure seal gasket or sealing ring 72, having a configuration in cross section corresponding to and slightly smaller than the cross sectional area of the interval or groove, may be seated, said pressure seal gasket or sealing ring taking the form of a yieldable material, as for example, a soft iron, copper, or other suitable material, depending upon the anticipated service requirements.

Inwardly of the pressure seal gasket contact area, a positive clearance, delineated C, between bonnet 18 and yoke 40 is provided, as shown, to permit relative movement of components.

Inasmuch as an alignment of the bonnet center line with the body center line is not fully provided by the diametral fit of the bonnet within the body, a further point of centering is requisite, and such necessary second bonnet centering point is provided in a close fit between an inwardly-facing yoke surface 74 and an adjacent confronting peripheral surface of bonnet 18, the yoke being concentric with the body by virtue of the previously defined male and female guide fit.

The upper portion of bonnet 18 is of such diameter that, upon assembly, it may be readily extendable through flange 41 of yoke 40 and interengaged therewith via a ring nut 76 circumadjacent and threadedly engaged with the upper portion of the bonnet. A desired preload on pressure seal gasket 72 may be effected by means of a plurality of circumferentially-arranged, vertically-extending threaded openings extending therethrough, in each of which openings a push-up stud 78 is threadedly engaged to allow a lowermost portion to bear upon the uppermost planar surface of flange 41. A tightening of the push-up studs is effected by the rotation thereof to cause same to bear downwardly upon the yoke flange, thereby effectuating a tight joint before internal fluid pressure is encountered.

In practice, the tightening of the push-up studs downwardly relative to the valve body and the yoke serves to force the bonnet against the gasket and to restrain same against relaxation so as to assure a positive initial and sustained tight sealing of the gasket or sealing ring into the wedged-shape interval. Once make-up loading is set up, the sealing surfaces are maintained stationary with respect to each other, and internal pressures thereafter generated within the valve body or casing serve to increase the sealing forces. That is to say, when internal pressure is applied, the outwardly-directed pressure forces, acting on the bonnet to force it outwardly of the body, are resisted by the downwardly-directed force of the gasket, which, because of the wedge shape, also provides a sealing force outwardly against the body. The vertical component is transmitted through the gasket to the yoke and loads the yoke in a circumferential manner internal to its line of endwise restraint, which line is also circumferential and is located at the outside diameter.

Thereby results a twisting loading on the bottom flange portion of the yoke wherein there is an upwardly pushing force at all points around the inside diameter and a downwardly pulling force at all points around the outside diameter, wherefor the flange is under a twisting influence such as to cause its upper portion to move outwardly and its lower portion to move inwardly.

As the yoke attempts to deform inwardly at its bottommost area, through the influence of the upwardly directed forces of the internal fluid pressure therebelow, it is restrained by its engagement with the corresponding diameter of body 2 at the top of bonnet extension 12. Accordingly, the valve body provides reinforcement and structural support to the yoke.

Conversely, under the internal fluid pressure forces, acting outwardly, and the gasket-wedging forces, particularly the outwardly-directed component thereof, the valve body is under an expected tendency to expand outwardly, which motion is, in turn, countered by the same inter-relationship of valve body and yoke. Thus the yoke may be considered to provide reinforcement and structural support to the valve body.

Of the two forces, in general, the inward-directed tendency of the yoke will be stronger than the outward-directed tendency of the body wall and the result will be to tighten the pressure seal surface of the body against the gasket.

Alternatively, as shown in FIG. 2, a pull-up arrangement may be employed which envisions the elimination of such a ring nut and the substitution therefor of a plurality of pull-up studs 178, each threadedly engaged with a nut 180 and each freely-receivable in an aligned vertically-extending opening in flange 141 of yoke 140 and threadedly receivable in base 132 of the bonnet.

To avoid needless repetitious description, similar characters of reference have been applied to the other corresponding parts in the illustrations of the forms of the invention illustrated in FIGS. 1 and 2 and new reference characters have been applied only where significant departures take place.

In both the forms of FIGS. 1 and 2, the threaded inter-engagement of valve body and coupling ring causes these instrumentalities to draw more tightly together when the valve body is influenced to expand outwardly under generated internal pressures, thereby achieving an attachment superior to the aforementioned attachment of yoke and body by weldment means from the standpoint of ability to prevent relative motion between gasket and body.

The design of the invention allows an extremely simple valve disassembly sequence as follows: the push-up studs or pull-up bolts, as the case may be, are backed off a convenient distance, the large connecting ring nut is then turned in a direction to move the yoke away from the body until the yoke has been lifted approximately the same distance as the push-up studs or pull-up bolt nuts have been backed off, then the push-up studs or pull-up bolt nuts are tightened so as to lift the bonnet and to pull the gasket upwardly and out of the joint. Such sequence results in the entire top assembly being completely freed from the body.

Valve stem 24 is threadedly engaged at its upper extremity with a yoke bushing 82 rotatably mounted by suitable lower and upper thrust bearings 84 and 86 respectively supported by suitable shoulders between yoke bushing 82 and the circumadjacent upper portion of yoke 40.

Such thrust bearings are capable of sustaining both upward and downward loading and may be made of the same size and/or shape, although, as shown, advantage is taken of the lesser upward stem load requirement as compared with the downward seating load by providing a smaller bearing, such as 84, to sustain upward load and a larger bearing, such as 86, to sustain the stem load.

In the back-seating direction of loading (i.e. with the stem pulling downwardly on the bearing), the load is transmitted into lower thrust bearing 84 and thence into yoke 40.

In the opposite direction (i.e. with the seating of the closure element), the valve stem is pushing upwardly, wherefore the load travels outwardly through upper thrust bearing 86 into a thrust bearing retaining nut 88 and thence into yoke 20.

Rotation of yoke bushing 82 in thrust bearings 84 and 86 produces axial movement of valve stem 24 which is held against rotary movement by a stem anti-rotation key or collar 90, centrally and non-rotatably secured to valve stem 24 as by a key 92, and having opposite outermost free extremities extending through diametrically-aligned vertically-disposed guideways or slots 94 in yoke 40, the sides of said guideways or slots being dressed to cure geometry imperfections and to insure identical contact at both sides of the construction, particularly at the lower extreme of travel where maximum loads are sustained.

The novel hammer blow drive arrangement hereof will presently be described, it being stressed that the general problem of moving a valve from opened to closed position involves total energy requirements of considerable magnitude, and widely varying operating force, the force initially required for running the stem down to the nearly-closed position being of one magnitude and the force required finally, as fully-closed position is reached, being substantially greater.

A hammer blow drive arrangement provides a practical means for applying this substantially greater seating torque with a handwheel size otherwise no more than adequate for the run-down torque. This greater torque results from the nearly instantaneous delivery of kinetic energy previously delivered to the handwheel over a considerably longer period of time. Thus, while input torque and acceleration are relatively low, deceleration being many times greater at the instant of impact, the torque developed at impact is many times greater than the input torque.

The hammer blow drive arrangement broadly envisions the provision of a kinetic energy storage means and a delivery of that kinetic energy on impact in a manner such as to generate a high torque sufficient to cause rotation of the valve operating nut until the energy is dissipated in friction. An operator, who is himself not able to deliver sufficient torque to overcome this friction statically, now is allowed means to store energy and, in effect, to raise the level thereof to a higher torque to overcome the friction and to deliver the final seating thrust.

In actual experience, one man, using the hammer blow drive arrangement hereof, has been found to be able to deliver from two to six times the torque he can apply by a steady manual pull, with the general effectiveness of the hammer blow drive arrangement hereof proving greater as the handwheel size is increased.

As industry needs have progressively involved increasing size and pressure, increasing loadings have resulted in obviously concomitant needs for increasing the handwheel sizes, eventually reaching the point of absurdity where the total energy required is simply beyond the practical limits of manual exertion. For example, a valve with a 3½″ diameter stem requiring 12 inches of movement from open to closed position at a pressure of 2,500 p.s.i requires energy the equivalent of lifting a large automobile a distance of six feet.

The use of other energy sources to operate large high pressure valves, as by electric or air power, presents serious cost considerations. In the instance of the operation of a base load installation, for example, where the base load unit is continuously operative, save for eventualities dictated by absolute necessity, there is understandable reluctance to make the financial investment demanded by conventional motor operators; hence the search for other means with which to make use of a motor drive without incurring the high cost of permanently-mounted motor-driven gear operators.

With the total energy required having become embarrassingly large, and with as many as five men, for instance, delivering something less than 1 horsepower to meet the requirement of bringing a valve to closed position, the solution, as provided herein, proves entirely novel and inventive, involving the use of a portable power device for both the running down and final seating operations.

The invention provides for both power running down and power seating by means of a portable power drive demonstrating a capacity for moving the movable valve parts into closing position and for subsequently fulfilling the impacting function made practical by using a different gear ratio, allowed by the incorporation hereinto of gears of different sizes.

To permit the storing of a maximum amount of kinetic energy in the handwheel by use of the power drive means employed herewith, a novel lug arrangement is here provided allowing the passing of one lug by another so as to permit free travel rotatively before impact through an arc of approximately 270°, as compared with a limited rotation of approximately 90° in prior art devices having balanced impact characteristics.

By means hereof, I allow a set of reactions against operating nut bearings so that impact occurs simultaneously at diametrically opposed points and the reactive forces balance out so as to allow delivery of essentially pure torque into the nut through the keys.

By shifting the drive means from one drive pinion to the other and by applying the full power of the power drive to the handwheel, the handwheel may be effectively accelerated to a speed higher than would be reasonably or practically expected to be attainable by man power.

The power drive will have certain normal operating speed-load characteristics. Applying this drive to the small drive pinion, by backing the handwheel off so as to create the hammer blow force, free wheeling speed may be quickly developed, but because of the large gear ratio the rotational velocity of the handwheel will be small and the kinetic energy available at impact inadequate for satisfactory closure. By employing the other of the drive pinions, identified as the large drive pinion, and with the terminal speed of the handwheel substantially conforming to the normal operating speed of the power drive, at impact, a satisfactory amount of energy sufficient to develop the required high torque is delivered. For example, if the pinion to gear ratio for the large drive pinion is one half that of the small drive pinion, rotative speed of the handwheel can be approximately doubled and the energy stored in the handwheel can be approximately quadrupled.

With one drive pinion only, there would be allowed no ability to deliver both the requisite high torque (and concomitant low velocity) during the main portion of valve stem travel and the requisite higher velocity for impacting.

With further reference now to FIG. 1 of the drawings, thrust bearing retaining nut 88 will be seen to be threadedly engaged with the uppermost extremity of yoke 40 to retain thrust bearings 84 and 86 in operating positions relative to yoke 40 and yoke bushing 82.

Having anticipated a requirement for orientation of an impacting handwheel 96 and its associated gearing and their integrity relative to pinions, to be described, and desiring a low friction suport means for said handwheel, I provide, uppermost of yoke bushing 82 and exteriorly thereof, a machined circumferential groove adjacent its upper extremity to serve as an inner ball-bearing race and complemental aligned grooves in the handwheel and in an annular cap 98, suitably and securely seated in a recess in the handwheel, to serve co-jointly as an outer ball-bearing race, balls 100 being inserted into and locked within the provided annular space therebetween, all whereby the handwheel is supported for rotative movement.

Upwardly of the horizontal plane of thrust bearing retaining nut 88 and downwardly of the corresponding plane of handwheel 96, I provide a cross arm assembly 102, keyed to yoke bushing 82 as by keys 104, and functioning to receive the heavy blows of the handwheel upon impact development.

Cross arm assembly 102 is provided with radially-extending abutments 106 and 108 interposed in relatively upper and lower planes respectively so as to be revolvable in different planes along selective orbits of different diameters and in the rotative path of lugs 110 and 112 depending downwardly from handwheel 96, said lugs 110 and 112 being adapted to engage said abutments.

Following contacting of abutments 106 and 108 by lugs 110 and 112, a steady pull on the handwheel will cause said handwheel, cross arm assembly 102 and yoke bushing 82 to rotate together to move valve stem 24 axially, thereby to move closure element 16 toward opened and closed positions, depending upon the direction of rotation.

In accordance with the invention, an auxiliary drive mechanism is novelly combined to operate the valve over the major portion of its travel, and comprehends a small drive pinion 114 stationarily secured to the upper end of a shaft 116 and meshing with a ring gear 118 secured to the inner circumferential surface of a depending annular peripherally-supported flange 120 of the handwheel as by a plurality of bolts, not shown, or equivalent means. Alternatively, said ring gear may be formed integrally with the handwheel.

A large drive pinion 122, also meshing with ring gear 118, is non-rotatably secured to a shaft 124 by a pin, not shown, or by other suitable means.

Drive pinions 114 and 122 are each supported for rotation in upper and lower bearings 126 and 128 respectively, said bearings being mounted in respective seats provided in an outwardly-extending pinion mounting arm or bracket 130 attached to or formed integrally with yoke 40.

The entire auxiliary drive assembly is mounted under the handwheel wherefor the overall valve size is not increased.

The outer end of each of shaft 116 and 124, which incidentally may be of square, hexagonal or other configuration and may be provided with a splined or grooved and keyed or equivalent drive connection construction, is adapted to be engaged and driven by the output shaft of a portable power drive unit 132 of a commercially available type, such as an air powered angle wrench produced by The Ingersoll-Rand Company.

Drive pinion 114 will be relatively small since it is intended to be used to drive the valve closure element through a major portion of its travel from open to nearly-closed position, and vice versa, requiring a relatively high steady torque and therefore a maximum gear ratio.

In a typical case, assuming the valve to be fully opened, power drive unit 132 is connected to shaft 116, wherefor it is rotated in proper direction to produce closing movement of the valve.

In most cases, the closing movement will be continued until closure element 16 contacts seat 10, at which time, the resistance to stem travel will exceed the torque applied by the drive unit and will cause the latter to stall.

Final seating of the valve will then be effected by shifting the drive unit or wrench to shaft 124 to effectuate final operation of the handwheel by the impacting, as previously referred to.

If the valve is fully seated, it will be initially started toward the opened position by suitable impacting operation of the handwheel in an opening direction through large drive pinion 94 until the relatively large seating loads have been relieved. Therefollowing, operation may then be shifted to small drive pinion 114 for the remainder of the opening travel.

The relation between the speed of rotation of shafts 116 and 124 and yoke bushing 82 will depend upon the respective pitch diameters of ring gear 118 and drive pinions 114 and 122 which can be varied within reasonable limits, as desired. In a typical case, ring gear 118 will have a twenty-seven inch pitch diameter, pinion 114 will have a three inch pitch diameter, and pinion 122 will have a six inch pitch diameter.

By utilization of the construction hereof, and due to its unique co-action with the conventional impacting handwheel, the time and effort necessary to operate the valve under any condition will be substantially reduced and at much lower cost than that attendant with prior art fully motor operated valves.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiments thereof, to the end that others can, by applying current knowledge, readily adapt same for various applications without omitting features which, from the standpoint of prior art, fairly constitute essential characteristics of its generic and/or specific aspects. The substitution of equivalents and other changes, modifications and alterations, as circumstances may suggest or render expedient, are reasonably contemplated, the invention being susceptible of such without departing from its real spirit or underlying principles.

The claims are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims.

I therefore particularly point out and distinctly claim as my invention:

1. A pressure seal closure in a valve construction, comprising, a valve housing including a main body having a fluent material flowway therethrough and a bonnet extension thereabove, a valve, a valve stem reciprocable within and relative to the extension, an annular axially-movable bonnet within the extension and having an internal surface for guiding the valve stem and an external surface for slidingly engaging the extension, a yoke having a lowermost downwardly-facing face seatable upon an uppermost upwardly-facing face of the extension and an annular radial flange extending inwardly of the seat, inosculating surfaces on the faces of the yoke and extension forming an interdigitated diametral yoke-extension interlock for effecting concomitant translational movements of the yoke and extension, the extension being externally threaded with a thread of one hand adjacent its face and the yoke being externally threaded with a thread of an opposite hand adjacent its face, an external differentially-threaded coupling means having flights of threads leading from opposite ends and being engageable respectively with the threads of the extension and the yoke, the extension and bonnet and yoke flange defining an annular pressure seal gasket chamber at their juncture of opposed relationship, an annular pressure seal gasket disposed within the chamber, makeup loading means tightenable down upon the yoke flange for pulling the bonnet upwardly in the development of continuous peripheral contact between the gasket and the bonnet and extension under the gasket-retaining influence of the yoke flange for initial sealing in the absence of substantial applied internal pressure, the bonnet being upwardly movable independently of the makeup loading means under the influence of applied internal pressure for increasing the pressure sealing engagement with outwardly-directed loading being sustained and opposed by the coupling means and diametral interlock.

2. In the pressure seal closure as set forth in claim 1, said makeup loading means including a plurality of pull-up bolts loosely extendable through the yoke flange with each pull-up bolt having a pull-up bolt nut threadedly engaged therewith upwardly of the yoke flange and being threadedly engaged with the bonnet downwardly of the yoke flange and with the pull-up bolt nuts being tightenable down upon the yoke flange.

3. In the pressure seal closure as set forth in claim 1, said makeup loading means including a ring nut threaded upon the bonnet and a plurality of circumferentially-arranged push-up studs threadedly engaged with the ring nut and being tightenable down upon the yoke flange.

4. In the pressure seal closure as set forth in claim 1, the inosculating surfaces of the diametral interlock being defined by a series of annular concentrically-arranged surfaces on the face of the yoke opposed by and intermeshing with a complemental series of annular concentrically-arranged surfaces on the face of the extension.

References Cited by the Examiner
UNITED STATES PATENTS

| 279,086 | 6/1883 | Emery | 285—331 |
|---------|--------|-------|---------|
| 2,665,875 | 1/1954 | MacGregor | 251—367 |

M. CARY NELSON, *Primary Examiner.*

MARTIN P. SCHWADRON, *Examiner.*

R. J. MILLER, *Assistant Examiner.*